Sept. 14, 1926.

D. W. PERIN

SWIVEL CASTER

Filed August 7, 1924

1,599,485

Inventor:
Donald W. Perin.
by Roberts, Roberts & Cushman,
Attys.

Patented Sept. 14, 1926.

1,599,485

UNITED STATES PATENT OFFICE.

DONALD W. PERIN, OF BROOKLINE, MASSACHUSETTS, ASSIGNOR TO PERIN-WALSH COMPANY, OF BOSTON, MASSACHUSETTS, A CORPORATION OF MASSACHUSETTS.

SWIVEL CASTER.

Application filed August 7, 1924. Serial No. 730,604. REISSUED

This invention relates to swivel casters which are particularly adapted to be mounted on the bottom of containers, trucks, etc., for facilitating movement from place to place.

Containers which are loaded upon vehicles such as automobile trucks, ships and freight cars are ordinarily mounted upon swivel casters to facilitate movement onto and off from the vehicle. When the container is rolled onto the vehicle the caster must be locked against rotative movement so that the jars and jounces of the vehicle do not affect the containers which otherwise would be shaken from the vehicle. It is also desirable in this instance to prevent the caster from swiveling when rolled from restricted places because the casters tend to swivel in opposite directions and consequently cannot roll freely but must slide until the entire set are reversed. This often results in broken casters, and of course is extremely troublesome.

Objects of the invention are to provide a swivel caster which is capable of being locked from both rotative and swiveling movement; to provide a new and improved antifriction bearing arrangement to enable the caster efficiently to operate under heavy loads; and to provide a caster which is sturdy and rugged, has relatively few parts, is inexpensive to manufacture and has the novel features of construction and arrangement hereinafter described.

Generally, this invention provides a caster which may readily be locked positively against swiveling movement as well as rotative movement of the caster wheel. Preferably the locking arrangement is such that the swiveling movement of the caster may be checked or prevented selectively in one of several positions. The lock for the wheel is adapted to lock the wheel against rotation in any position, preferably independently operated from the swivel lock of the wheel. It is also contemplated to provide a relatively large bearing area for swiveling preferably employing both ball and roller bearings so that the caster will readily swivel about substantially a vertical axis and rotate regardless of the load imposed thereon.

Figure 1:
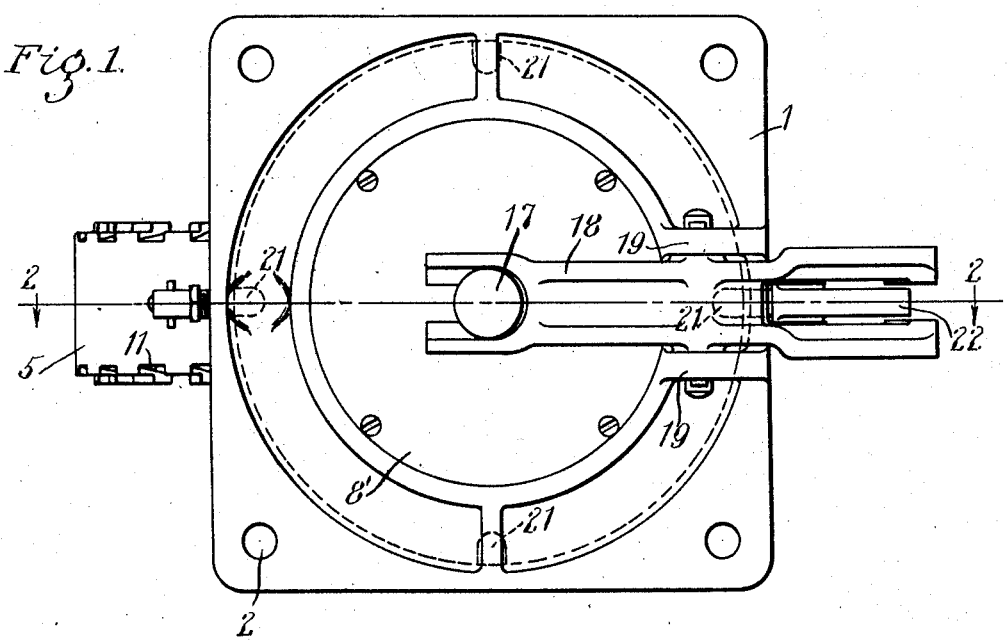
Figure 2:
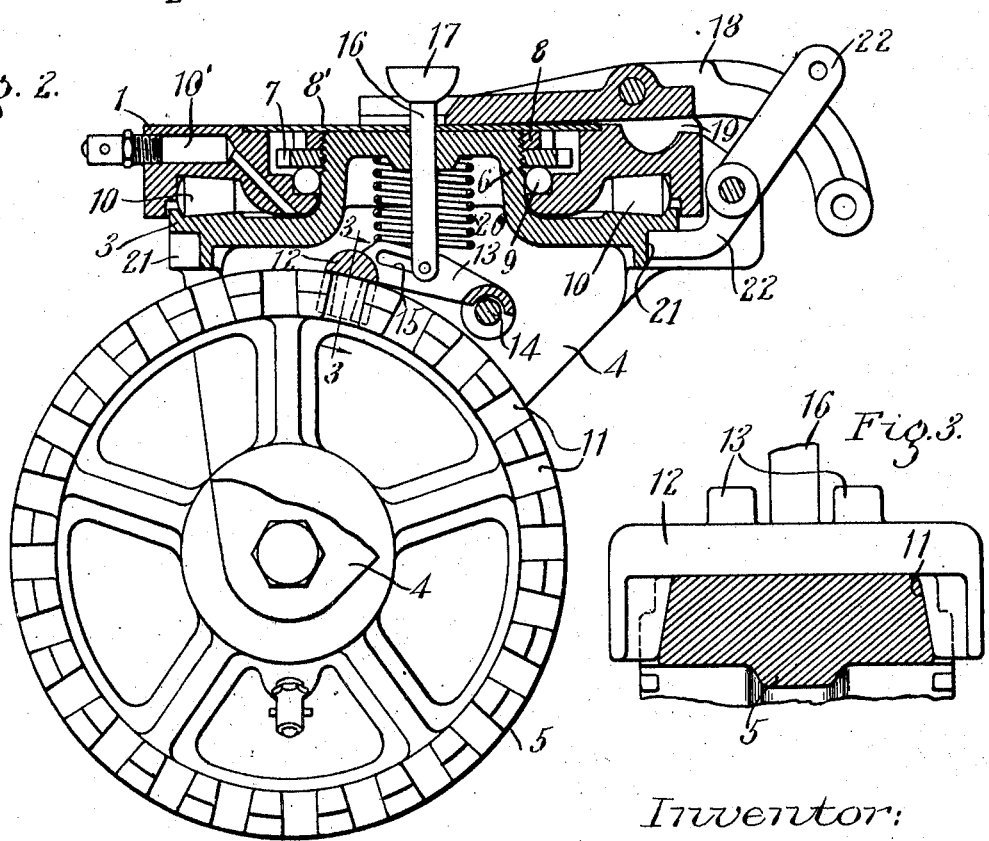
Figure 3:
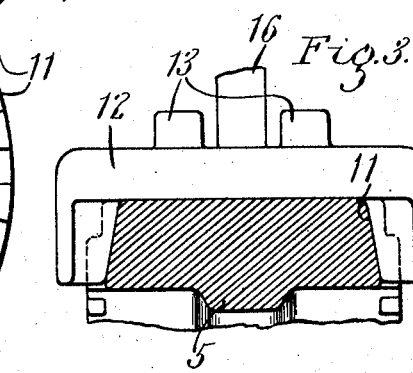

The invention is illustrated in one of its preferred forms in the accompanying drawings in which:

Fig. 1 is a top plan view of the caster;
Fig. 2 is a vertical sectional view of the caster; and
Fig. 3 is a section on the line 3—3 of Fig. 2.

In the embodiment of the invention shown the caster comprises a head having a rectangular plate 1 provided with holes 2 through which bolts or screws may extend for mounting the caster and a circular plate 3 connected to but rotatable relatively to the plate 1. Integral with the bottom of the circular plate 3 are a pair of inclined forks 4 between which a wheel 5 is suitably journaled, so that the caster when mounted is able to rotate between the forks 4 and also swivel about a substantially vertical axis through an arc of 360°.

The plate 3 is rotatable with respect to the plate 1 and for this purpose the plate 3 is provided with an upstanding exteriorly threaded hollow boss 6 extending through a central opening in the plate 1, the upper surface of the boss being nearly flush with the surface of the plate 1. Screwed onto the boss 6 are a pair of rings 7 and 8, and the ring 7 provides a race for ball bearings 9 disposed in an annular groove in the plate 1, the ring 8 serving to lock the ring 7 against movement. A cover disc 8' is secured to the plate 1 as by screws and prevents the access of dirt or grit to the bearings 9. In order to receive the thrust from the wheel 5, frusto-conical roller bearings 10 are provided between the plates 1 and 3 mounted in an annular groove in the plate 1. As shown a passage 10' is provided in the plate 1 into which lubricant may be forced for lubricating both series of bearings and as mounted a relatively large bearing surface is provided thus permitting the caster to swivel readily under heavy loads. By reason of the fact that the roller bearings 10 and the ball bearings 9 are so arranged that both are cut by a single plane to which the axis of the central opening in the plate 1 is perpendicular a very compact and rigid arrangement is produced in which for a given height of caster the wheel diameter may be made as large as possible.

It is often desirable to lock the wheels 5 from rotating and accordingly the wheel 5 is provided with a series of grooves 11 upon opposite faces about the entire circumference. The arms of a yoke 12 are arranged to extend into a groove on each face of the wheel, thus positively locking the wheel against rotation. By providing a plurality of grooves about the wheel, rotation thereof can be prevented in any position. By reason of the construction of the recesses 11 without blind bottoms a substantial advantage is obtained over constructions in which holes are simply drilled for a distance into the peripheries of caster wheels. With the latter form of construction the holes soon become so filled up with dirt that locking of the wheels is a virtual impossibility without the labor of periodically cleaning out accumulated material from the holes.

In order to operate the locking yoke 12, arms 13 integral with the yoke extend at substantially right angles therefrom and are provided with a pin 14 secured to the forks 4 at opposite ends. Connected to the intermediate portion of the arms 13 and movable in an elongated slot 15 is an upright pin 16 which extends through the plate 3 and is provided with a head 17. In order to raise the pin 16 to release the yoke 12 from the grooves 11 in the wheel, a lever 18 is pivoted to lugs 19 on the plate 1 and is formed with bifurcated ends which are arranged to engage the head 17. However, normally the yoke 13 is held in locking position by a spring 20 mounted in a recess in the boss 6 so that unless the pin 16 is raised to disengage the yoke 12 the wheel is locked from rotation.

When mounted the casters tend to swivel to the rear, but if the several casters start to swivel to reverse position in opposite directions they cannot roll freely, but must slide until all are reversed. To overcome this objection, the plate 3 is provided with four notches 21 spaced apart at about 90° and into one of which one end of a lever 22 is arranged to extend. The lever 22 is pivoted to the plate 1 and when moved into one of the notches swiveling movement of the caster about a vertical axis is prevented. By arranging the notches as shown the wheel 5 may selectively be locked positively in different positions at substantially right angles to each other.

A caster constructed similarly as described may be used in a variety of places wherever vehicles are movable from one place to another, and because of the relatively small number of parts and compact and sturdy construction it lends itself admirably to the needs of service.

I claim:

1. A caster comprising, in combination, a wheel, a mounting therefor relative to which the same is rotatable on its axis, said wheel having a locking recess opening through the peripheral surface of the wheel and also opening through another bounding surface of the wheel, and means engageable in said recess to prevent rotation of said wheel.

2. A caster comprising, in combination, a wheel, a mounting therefor relative to which the same is rotatable on its axis, said wheel having a recess therein having an opening through a surface of the wheel into which an element may move to lock said wheel against rotation and a second opening through a surface of said wheel in alignment with said first mentioned opening, and means engageable with said opening to prevent rotation of said wheel.

3. A caster comprising, in combination, a wheel, a mounting therefor relative to which said wheel is rotatable on its axis, said wheel having a peripheral surface and opposite lateral surfaces and notches in said lateral surfaces opening through said peripheral surfaces, and means engageable in a plurality of said notches simultaneously to hold said wheel against rotation.

4. A caster comprising, in combination, a wheel, a mounting therefor relative to which said wheel is rotatable on its axis, said wheel having a plurality of pairs of substantially radially extending notches, the notches of said pairs being arranged at opposite sides of said wheel, and means engageable simultaneously with both notches of a pair to hold said wheel against rotation.

5. A swivel caster comprising a member for mounting the caster and a second member rotatable relative to said first member, means carried by said second member for rotatively supporting a wheel, a wheel supported thereby, a lever on said second member engageable with said wheel to preclude rotation thereof, a lever pivotally mounted on said first member operable to control said first mentioned lever, and operative connections between said levers including an element extending along the axis of rotation of said second member.

6. A swivel caster comprising a stationary portion, a portion swiveled thereon for rotation on a vertical axis and providing a support for a wheel rotatable on a horizontal axis, a wheel rotatably supported thereon for rotation as specified, and means for locking said wheel against rotation including a lever pivoted on said wheel supporting portion upon a fulcrum offset from the axis of swiveling of said supporting portion, a second lever pivoted on said stationary portion, and a connection between said levers coincident with the axis of swiveling.

7. A swivel caster comprising a stationary portion, a portion swiveled thereon for rotation on an axis perpendicular to said first mentioned portion, said swiveled portion carrying a wheel rotatable on an axis lying in a plane to which the swivel axis is perpendicular, means for locking said wheel against rotation including a lever on said swivel portion fulcrumed for pivotal movement on an axis offset from the axis of said swivel, and means on said stationary portion operatively connected with said lever for controlling the lever in all the positions of said swiveled portion.

8. A caster comprising a head for attachment to a vehicle, a wheel journaled on said head and having a series of grooves on opposed faces thereof, a lever on said head movable to enter a groove in both faces of the wheel thereby positively to prevent rotation thereof, a spring for normally holding said lever in engagement with said wheel and means for disengaging said lever from the wheel.

9. A caster comprising a head composed of relatively rotatable parts, one part being adapted for mounting the caster, a wheel journaled on the other part and having a series of grooves on opposed faces thereof, a lever on said other part movable to enter a groove in both faces of the wheel thereby positively to prevent rotation thereof, a spring for normally holding said lever in engagement with said wheel, means on said first part for disengaging said lever from the wheel, and a lever also on said first part movable positively to engage said other part for preventing relative rotation thereof.

10. A caster comprising a head composed of relatively rotatable parts, one part being adapted for mounting the caster, a wheel journaled on the other part, means on said head normally engaging said wheel locking said wheel against rotation, means for disengaging said locking means, and means on said first part movable to engage said other part for preventing relative rotation thereof while said first mentioned means is inoperative.

11. A caster comprising a head composed of relatively rotatable parts, a wheel journaled in one part, means engageable with said wheel in different rotative position for preventing rotation of said wheel, and independent means on one of said parts movable to engage the other part for preventing turning of said wheel about a vertical axis.

12. A swivel caster comprising a pair of superposed members, a wheel journaled on the lower member, the upper member being provided with an aperture, a projection on said lower member extending through said aperture, one of said members being provided with a groove adjacent the outer periphery thereof, anti-friction bearings in said groove, a plate removably connected to said projection, an inner concentric ring of antifriction bearings between the underside of said plate and upper member, and means for locking said ring in place, said bearings being so disposed that both sets are cut by a single plane to which the axis of said aperture is perpendicular.

13. A swivel caster comprising a pair of superposed members, a wheel journaled on the lower member, a projection on said lower member extending through an aperture in the upper member, one of said members being provided with a circumferential groove adjacent its outer periphery, frusto-conical roller bearings mounted in said groove between said members, a plate secured to said projection, and antifriction bearings between said plate and upper member, said bearings being so disposed that both sets are cut by a single plane to which the axis of said aperture is perpendicular.

14. A swivel caster comprising a pair of superposed members, a wheel journaled on the lower member, a projection on said lower member extending through an aperture in the upper member, said upper member being provided with a circumferential groove adjacent its outer periphery, frusto-conical roller bearings in said groove between said members, a plate removably connected to said projection, and an inner ring of ball bearings concentric to said roller bearings between the underside of said plate and upper member, said bearings being so disposed that both sets are cut by a single plane to which the axis of said aperture is perpendicular.

15. A caster comprising in combination a wheel, a mounting therefor, said wheel having a locking recess in the side thereof the sides of the recess being approximately parallel with the axis of the wheel, and a pivoted locking lug movable relative to said mounting into said recess to lock the wheel against rotation on its axis.

16. A swivel caster for freight containers and the like comprising a head for fixed attachment to a container, a yoke swiveled in the head, the yoke having a locking recess in its periphery, and a locking lug movably mounted on the head to engage said recess, thereby to lock the caster against swiveling.

17. A swivel caster for freight containers and the like comprising a head, a yoke swiveled in the head, the yoke having a circular portion concentric with the swivel axis with locking recesses therein, and locking means movably mounted on the head to move into said recesses selectively, thereby to lock the caster against swiveling in different positions.

18. A swivel caster for freight containers and the like comprising a head for fixed attachment to a container, a yoke swiveled in the head and having a locking recess in a portion thereof, and a locking lug mounted on said head to move into said recess, said portion of the yoke sliding past the locking lug until the lug registers with the recess when the lug is actuated toward locking position during swiveling movement.

19. A swivel caster for freight containers and the like comprising a head for fixed attachment to a container, a yoke swiveled in the head and having beneath the head a circular periphery provided with locking recesses, and a locking lug pivoted on said head to swing into one of said recesses.

20. A swivel caster for freight containers and the like comprising a head for fixed attachment to a container, the head having an axial opening, a yoke having a peripheral portion underneath said head and a part extending into said opening, axial and radial bearings between said head and part in said opening, axial bearings between said head and portion, and a locking lug pivoted on said head for engagement in a locking recess in said peripheral portion of the yoke.

21. A swivel caster for freight containers and the like comprising manual control means movable to operative position in any swivel position of the caster, and means automatically responsive to said control means when the caster is swiveled into predetermined position for locking the caster against swiveling.

22. A swivel caster comprising a stationary portion, a portion swiveled thereon for rotation on a vertical axis and providing a support for a wheel rotatable on a horizontal axis, a wheel rotatably supported thereon for rotation as specified, and means for locking said wheel against rotation including a lever pivoted on said wheel supporting portion, a second lever pivoted on said stationary portion, and a connection between said levers coincident with the axis of swiveling.

23. A swivel caster comprising a stationary portion, a portion swiveled thereon for rotation on an axis perpendicular to said first mentioned portion, said swiveled portion carrying a wheel rotatable on an axis lying in a plane to which the swivel axis is perpendicular, means for locking said wheel against rotation including a lever on said swivel portion, and means on said stationary portion operatively connected with said lever for controlling the lever in all the positions of said swiveled portion.

24. A swivel caster comprising a member for mounting the caster and a second member rotatable relative to said first member, means carried by said second member for rotatively supporting a wheel, a wheel supported thereby, a lever on said second member engageable with said wheel to preclude rotation thereof, a lever pivotally mounted on said first member operable to control said first mentioned lever, and an operative connection between said levers including an element extending through an aperture in the center of said first member.

25. A caster comprising a head for attachment to a vehicle, a wheel journaled on said head and having a series of grooves on a face thereof, a lever on said head movable to enter any one of said grooves thereby positively to prevent rotation thereof, a spring for normally holding said lever in engagement with said wheel and means for disengaging said lever from the wheel.

26. A swivel caster comprising a stationary head, a rotary head, roller bearings between said heads, and means extending through openings in said heads for locking the caster roller.

27. A swivel caster comprising a stationary head having an opening therein, a rotary head having a projection extending through said opening, a bearing plate surrounding said projection, roller bearings between said plate and stationary head, and means for adjusting said plate on said projection.

28. A swivel caster for freight containers and the like comprising a head member for fixed attachment to a container, a yoke member swiveled in the head, one of said members having a locking recess in its periphery, and a locking lug movably mounted on the other member to engage said recess, thereby to lock the caster against swiveling.

Signed by me at Boston, Massachusetts, this 5th day of August, 1924.

DONALD W. PERIN.